United States Patent
Van De Wijdeven et al.

(10) Patent No.: US 8,237,685 B2
(45) Date of Patent: Aug. 7, 2012

(54) METHOD AND APPARATUS FOR OBJECT LEARNING AND RECOGNITION BASED ON OPTICAL PARAMETERS

(75) Inventors: Sander Bernard Francis Van De Wijdeven, Eindhoven (NL); Tatiana Aleksandrovna Lashina, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 541 days.

(21) Appl. No.: 12/303,296

(22) PCT Filed: Jun. 26, 2007

(86) PCT No.: PCT/IB2007/052471
§ 371 (c)(1),
(2), (4) Date: Dec. 3, 2008

(87) PCT Pub. No.: WO2008/007276
PCT Pub. Date: Jan. 17, 2008

(65) Prior Publication Data
US 2010/0060896 A1      Mar. 11, 2010

Related U.S. Application Data

(60) Provisional application No. 60/806,045, filed on Jun. 28, 2006.

(51) Int. Cl.
*G06F 3/042* (2006.01)
(52) U.S. Cl. .......................................... 345/175
(58) Field of Classification Search .............. 345/175, 345/176; 178/18.09
See application file for complete search history.

(56) References Cited

U.S. PATENT DOCUMENTS

| | | | | |
|---|---|---|---|---|
| 3,685,040 A | * | 8/1972 | Hart | 345/109 |
| 3,829,202 A | * | 8/1974 | Liddell | 352/62 |
| 4,301,447 A | * | 11/1981 | Funk et al. | 341/5 |
| 4,855,590 A | * | 8/1989 | Bures et al. | 345/175 |
| 5,414,413 A | * | 5/1995 | Tamaru et al. | 345/175 |
| 5,635,724 A | * | 6/1997 | Higgins | 250/559.19 |
| 6,337,918 B1 | | 1/2002 | Holehan | |
| 6,429,857 B1 | * | 8/2002 | Masters et al. | 345/175 |
| 6,690,363 B2 | * | 2/2004 | Newton | 345/173 |
| 6,836,367 B2 | * | 12/2004 | Seino et al. | 359/618 |
| 2002/0067348 A1 | | 6/2002 | Masters et al. | |
| 2002/0167669 A1 | | 11/2002 | Schwarz | |
| 2004/0208373 A1 | | 10/2004 | Aoki et al. | |

FOREIGN PATENT DOCUMENTS

| EP | 0366913 A2 | 5/1990 |
|---|---|---|
| WO | 0207072 A | 1/2002 |
| WO | 2006095320 A2 | 9/2006 |

* cited by examiner

Primary Examiner — K. Wong

(57) ABSTRACT

A method, device and computer program product for determining the material of an object based on its optical characteristics is disclosed. More specifically, the method operable on a touch screen that includes on its periphery a plurality of light sources ($L_i$, i=1 to N) and sensors ($S_j$, j=1 to M), comprises the steps of transmitting a light from each of the light sources to an object within the boundary of the touch screen, determining a distance from the object to each of the light sources and each of the sensors, detecting the presences of the transmitted light at each of the sensors, determining, at each of the sensors a reflective index, $n_2$ of the object and determining the object material based on the determined reflective indices.

24 Claims, 5 Drawing Sheets

METHOD AND APPARATUS FOR OBJECT LEARNING AND RECOGNITION BASED ON OPTICAL PARAMETERS

This application is a continuation-in-part and claims the benefit, pursuant to 35 USC 120, of the earlier filing date of that patent application entitled "System and Method for Detecting the Location, Size and Shape of Multiple Object that Interact with a Touch Screen Display", filed in the US Patent Office Mar. 10, 2005 and afforded the Ser. No. 60/660,366 the contents of which are incorporated by reference herein.

This invention relates to the field of object recognition and more specifically to a object recognition system based on object optical parameters.

Touch screens are commonly used as pointing sensors to provide a man-machine interface for computer driven systems. Typically, for an optical touch screen, a number of infrared optical emitters (i.e., transmitters) and detectors (i.e., receivers) are arranged around the periphery of the display screen to create a plurality of intersecting light paths. When a user touches the display screen, the user's fingers blocks the optical transmission of certain ones of the perpendicularly arranged transmitter/receiver pairs. Based on the identity of the blocked pairs, the touch screen system can determine the location of the intercept (single point interaction). With such a screen, a particular choice can be selected by a user by touching the area of the screen where that choice is displayed, which can be a menu option or a button. This use of perpendicular light beams, while widely used, is unable to effectively detect the shape and size of an object. Neither can the use of perpendicular light beams detect multiple objects or multiple touch points.

U.S. Patent Application Ser. No. 60/660,366 entitled "System and Method for Detecting the Location, Size and Shape of Multiple Object that Interact with a Touch Screen Display", filed in the US Patent Office Mar. 10, 2005, discloses a touch screen using optical emitters and sensors for detecting multiple objects within the touch screen, their location, size and shape. The detection method was based on the detection of shadows casted by objects while sequentially switching all LED emitters on and off and subsequently calculating the intersection of all shadow-polygons.

The method described in the referred-to patent application provides for detection of objects based on shadow detection. This approach determines the presence of objects on screen. Other methods to obtain knowledge on objects on screen include determining the objects' optical parameters like reflectivity and transmissivity. Further more, the reflectivity and transmissivity optical properties provide further information that can be used to discriminate between otherwise identically shaped objects of different materials.

Hence, there is a need in the industry for a method and apparatus utilizing optical properties for assisting in determining the objects being detected.

A method, device and computer program product for determining the material of an object based on its optical characteristics is disclosed. More specifically, the method operable on a touch screen that includes on its periphery a plurality of light sources i=1 to N) and sensors ($S_j$, j=1 to M), comprises the steps of transmitting a light from each of the light sources to an object within the boundary of the touch screen, determining a distance from the object to each of the light sources and each of the sensors, detecting the presences of the sequentially transmitted light at each of the sensors, determining, at each of the sensors, a reflective index, $n_2$ of the object and determining the object material based on the determined reflective indices.

The advantages of the present invention may be better under stood by referring to the following description taken into conjunction with the accompanying drawings in which.

Figure 1:
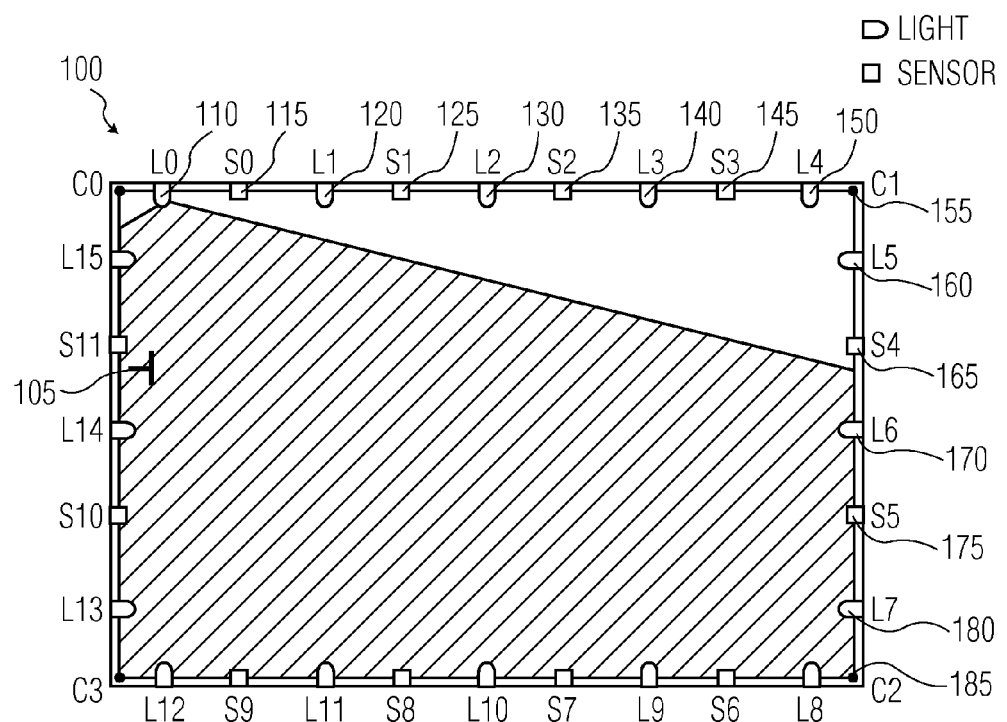
FIG. 1 illustrates a conventional multi-touch objection recognition apparatus.

It is to be understood that these drawings are solely for purposes of illustrating the concepts of the invention and are not intended as a definition of the limits of the invention. The embodiments shown in the figures herein and described in the accompanying detailed description are to be used as illustrative embodiments and should not be construed as the only manner of practicing the invention. Also, the same reference numerals, possibly supplemented with reference characters where appropriate, have been used to identify similar elements.

FIG. 1 illustrates a conventional multi-touchscreen apparatus including a display area 105 and light sources (L) 110, 120, 130, . . . 180 and sensors (S) 115, 125, 135, 145, . . . 185 positioned around the perimeter of display area 105 in an alternating pattern. Although not all the light sources and sensors are identified by a label, it would be recognized by those skilled in the art that the light sources and sensors are incorporated along the entire perimeter of display area 105, e.g., $S_{11}$, $L_{15}$). Preferably, the light sources 110, 120, 130, . . . 180 are light emitting diodes (LEDs).

Also shown, as a hatched area, is the area within display area 105 that light emitted from light source $L_0$, 110 covers. In this illustrated case, sensors $S_5$, 175, and $S_6$-$S_{11}$, each are able to detect light emitted for light source $L_0$, 110. Point $C_2$, 185 and $C_3$ represent points associated with the corners of display area 105. Similar area of light coverage and sensor reception may be determined for each of the light sources $L_0$ though $L_{15}$ and need not be shown in detail herein. In addition, the unobstructed light coverage patterns may be used to obtain calibration data that establishes a reference for each sensor for each light source.

Figure 2A:
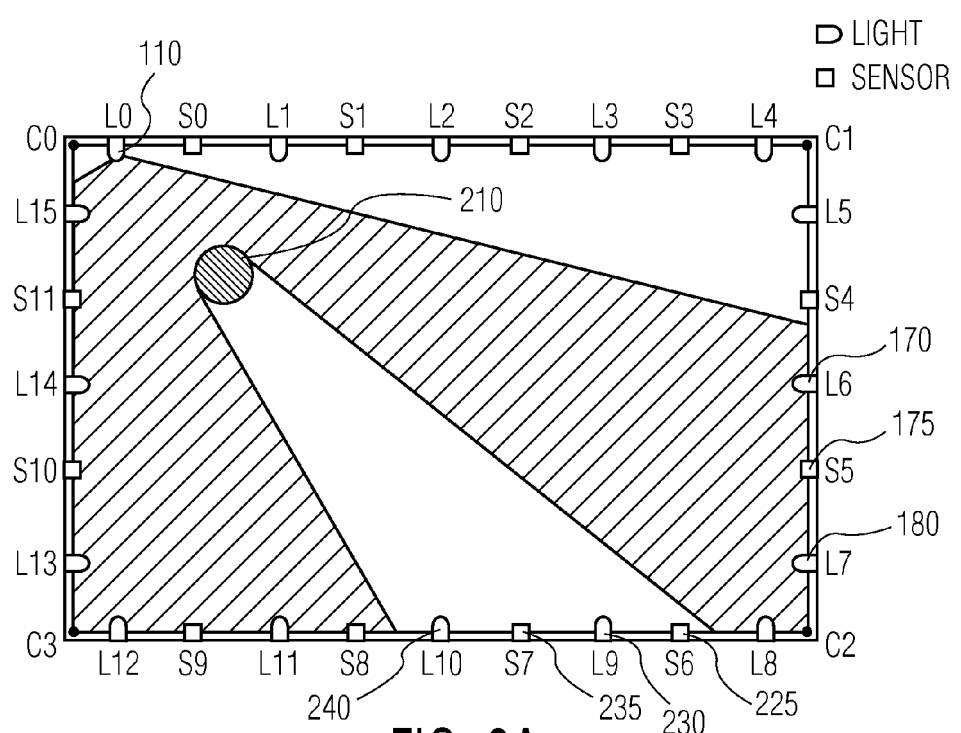
FIGS. 2A-2C illustrate examples of the reflection patterns within the object recognition device shown in FIG. 1.
Figure 2B:
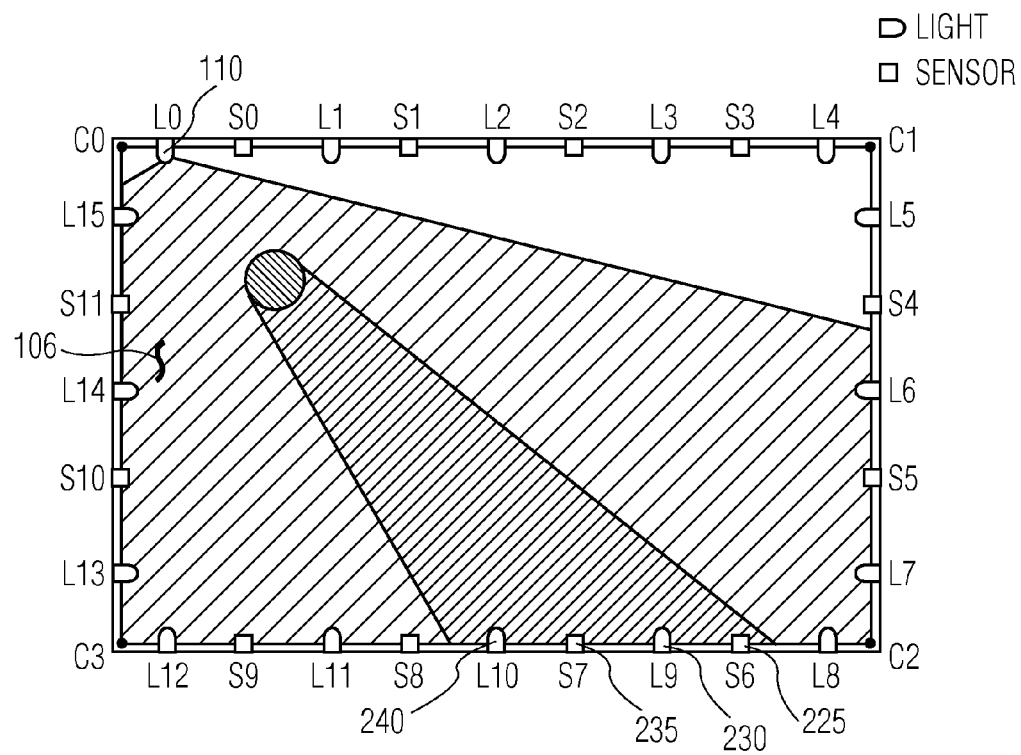
Figure 2C:
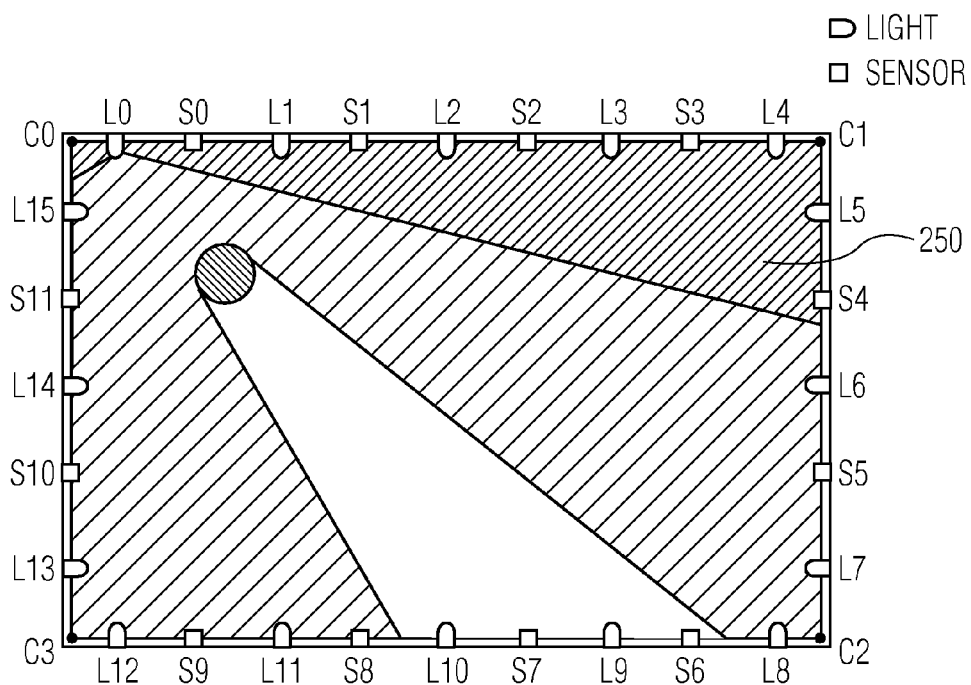

FIGS. 2A-2C illustrate examples of the coverage and sensor reception when an object is placed with display area 105. FIG. 2A illustrates a case wherein object 210 that absorbs 100 percent of the light emitted by light source $L_0$ 110 is included in display area 105. In this case sensors $S_6$, 225 and $S_7$, 235 are totally within the shadow of object 210 with respect to light source $L_0$, 110 and hence do not receive or detect any light. Furthermore, sensors $S_0$, 115, $S_1$, 125, $S_3$, 135 and $S_4$, 145 fails to detect any light from object 120 as no light is reflected by the object (i.e., total absorption) while sensor $S_5$, 175 and the other sensors detect the same amount of light emitted from light source $L_0$, 110 as if the object 210 were not within the display area 105.

FIG. 2B illustrates a case wherein object 210 included in display area 105 is partial absorptive and partially transmissive. In this case, sensors $S_6$, 225 and $S_7$, 235 are able to detect some amount of light emitted by light source L0, 110. The other sensors detect light from light source 110 as previously discussed. FIG. 2C illustrates a case wherein less than 100 percent of the light that reaches object's 210 surface gets absorbed and the remainder is reflected. This leads to sensors $S_0$, 115, $S_1$, 125, $S_2$, 135 and $S_3$, 145 detecting some light that would not normally be detected (area 250). As would be appreciated, the level of light detected by the sensors will be depend on a number of factors such as distance between the object and the sensor, shape of the object, reflections caused by other objects, etc.

Figure 3:
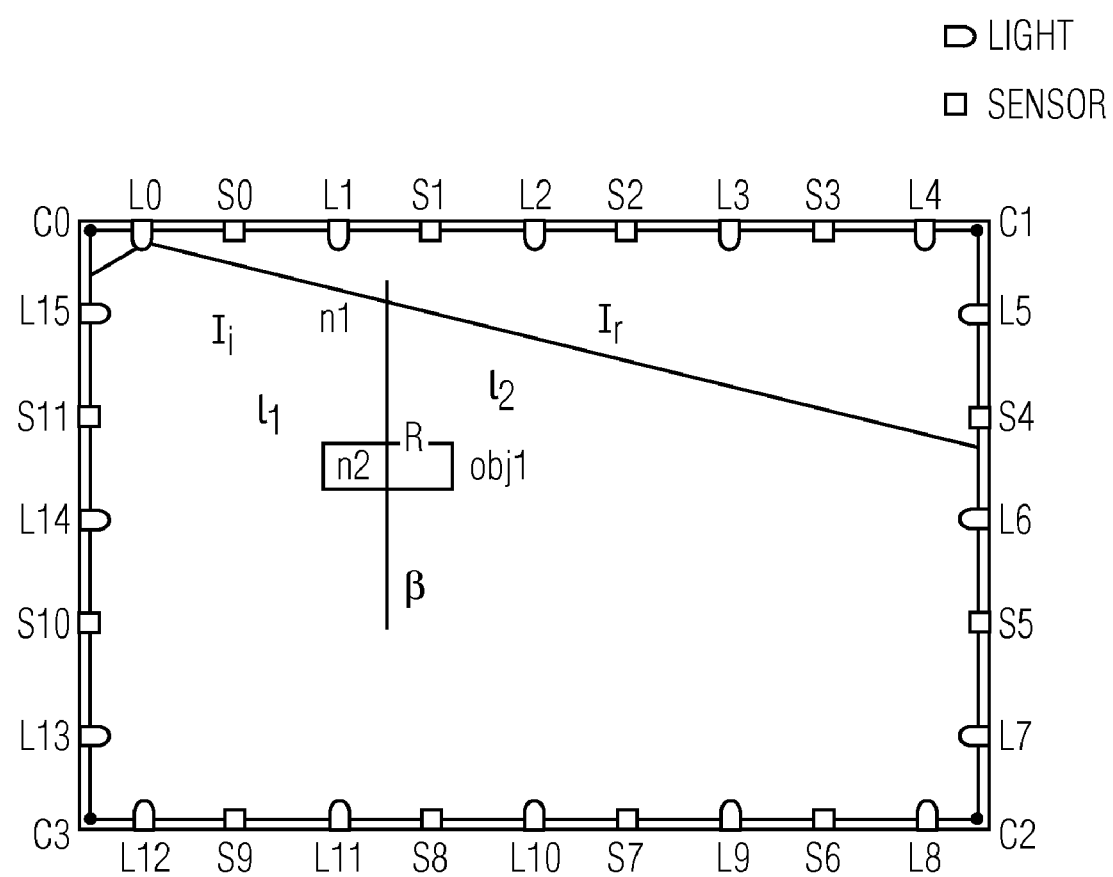
FIG. 3 illustrates the geometry for recognizing an object in accordance with the principles of the invention.

FIG. 3 illustrates a simplified example of the principles of the invention. In this simplified example, rectangular object 310, which is partially absorbing and partially reflective, is contained in the plane of touch screen 100. Assuming light propagates in the 2-dimensional plane of the touch screen 100, light emitted from LED $L_0$, 110 is reflected by object 310 (obj 1) such that sensor $S_2$, 135 is able to detect a portion of the reflected object. Following Snell's law, $n_1 \sin \alpha = n_2 \sin \beta$, the angle alpha can be determined as the coordinates of LED $L_0$, 110 and sensor $S_2$, 135, are known as well as the position and shape of object 310. Using the object area detection method as described in US patent application entitled "System and Method for Detecting the Location, Size and Shape of Multiple Object that Interact with a Touch Screen Display," the object surface orientation causing the reflection and distances $1_1$ and $1_2$ between LED $L_0$, 110, object 310, and sensor $S_2$, 135 can be determined.

The Fresnel equation for unpolarized light may be expressed as $$\frac{I_r}{I_i} = \left[ \left( \frac{n_1^{\cos\alpha} - n_2^{\cos\beta}}{n_1^{\cos\alpha} + n_2^{\cos\beta}} \right)^2 + \left( \frac{n_2^{\cos\alpha} - n_1^{\cos\beta}}{n_2^{\cos\alpha} + n_1^{\cos\beta}} \right)^2 \right] \quad [1]$$

where $I_r$ is the light intensity after being reflected from object 310;
$I_i$ is the light intensity just before it reaches the object surface of object 310;
$n_1$ is the refraction index which is close to 1, and
$n_2$ is the refraction index of object 310.

In order to determine the light intensity $I_r$ and $I_i$ the fall off of light intensity, $L_{iL0}$, emitted by LED $L_0$ with distance may be determined as:

$$I_i = I_{iL0} \frac{1}{l_1^2} \quad [2]$$

Similarly, the light attenuation as it travels between the point of reflection R, where it has intensity $I_r$ and sensor $S_2$, 135, where it has intensity $I_{rS2}$ may be determined as:

$$I_{iS2} = I_r \frac{1}{l_2^2} \quad [3]$$

Having knowledge of and $I_i$ and $I_r$, the reflective index $n_2$ of the object 310 may be determined. Additionally, reflective indices of various materials may be determined and stored in a data base (e.g. lookup table) that may be accessed to determine the specific material of object 310.

In one embodiment of the invention, light is sequentially transmitted by each of the light sources, $L_0$-$L_{15}$. One or more of the sensors, $S_0$-$S_{11}$ receive varying degrees of light as described with regard to equations 1-3. Hence, for each light transmitted from a corresponding light source a determination may be made of the reflective index, $n_2$, of the object being detected. In one aspect of the invention, the reflective index, $n_2$, may be determined from the light received at each sensor and an accumulated reflective index, $n_2$, may be associated with each light source. A final reflective index, $n_2$, may then be determined from each of the accumulated reflective indices. In another aspect, the final reflective index, $n_2$, may be determined from each of the determined reflective indices. For example, the final reflective index, $n_2$, may be determined as the average of each of the determined reflective indices. Alternatively, the final reflective index, $n_2$, may be determined using known histogram methods.

The material from which the material is composed may then be determined based on a correlation of reflective index, $n_2$, and material. This correlation information may be stored in a predetermined data base wherein the information contained therein may be determined empirically.

Figure 4:
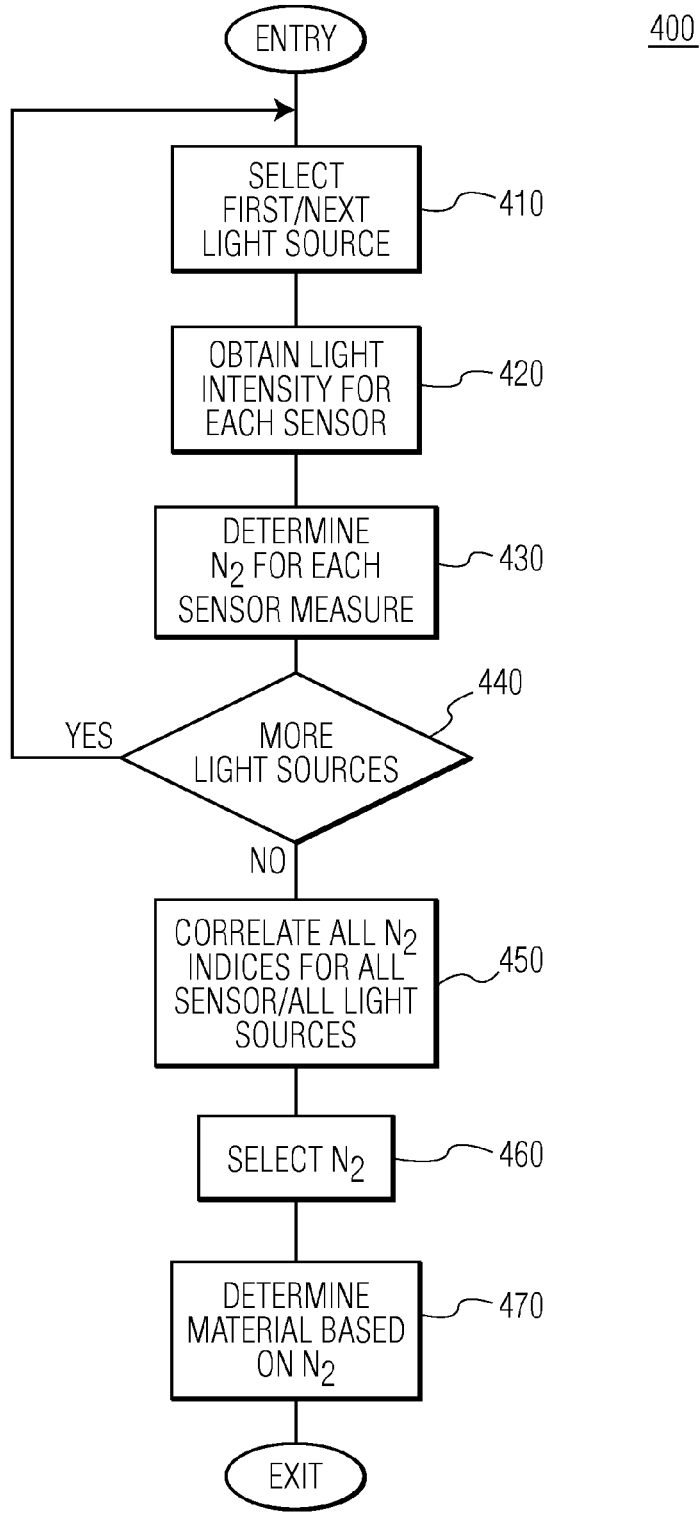
FIG. 4 illustrates a flow chart of an exemplary process for processing information of the touch screen object recognition apparatus in accordance with the principles of the invention.

FIG. 4 illustrates a flow chart of an exemplary process in accordance with the principles of the invention. In this exemplary process, at block 410, a first/next light source is selected to transmit light for a predetermined time. At block 420, the light intensity is obtained or measured at each sensor. At block 430, a reflective index is determined for each sensor based on the geometry as taught in equations 1-3. At block 440, a determination is made whether more light sources need to be processed. If the answer is in the affirmative, then processing continues at block 410 to select a next light source. However, if the answer is negative, then the reflective indices are correlated among all the sensors and all the light sources, at block 450. At block 460, a final reflective index is determined and at block 470 a material is determined based on the determined final reflective index.

In one aspect of the invention, the output of the optical parameter measurement can also be used to fine-tune the shape of the detected object. For example, when an object's material is determined or externally given and the convex shape is calculated by a shape detection process, a calculation can be implemented to determine whether the object is hollow or massive.

Figure 5:
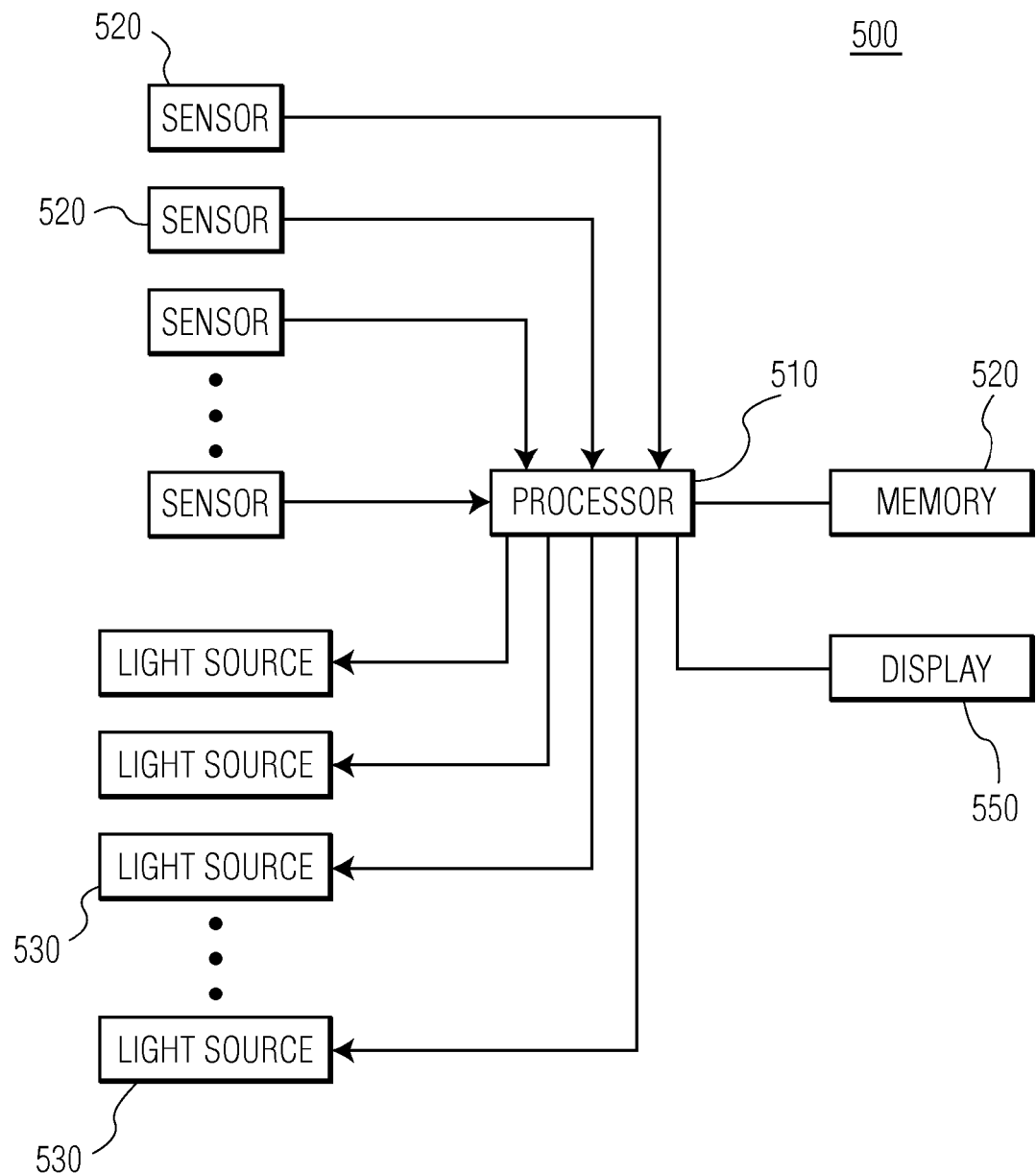
FIG. 5 illustrate exemplary system for executing the processing shown herein.

FIG. 5 illustrates an exemplary system 500 for executing the processing shown herein. In this exemplary system a processor 510 is in communication with a memory 520. The processor 510 is further in communication with sensors 520 and light sources 530. Processor 510 controls the turn on/off state of each of the light sources 530 and sensors 520 provide information regarding received light intensity. After processing the received information the processing information may be provided to a display unit 550 or other processing system.

In one embodiment of the invention, one or more control units or processors such as general purpose or special purpose computer system may be utilized to execute computer instructions to implement and respond to the light reflected and/or transmitted by object. The computer instruction may be provided in a computer product that is stored on a tangible medium or may be downloaded over a network. The computer instructions may be stored in memory 520.

In another aspect of the invention, the processor(s) may be a hardware configuration, such as a dedicated logic circuit or integrated circuit. For example, the processor(s) may selected from a group dedicated hardware such as Programmable Array Logic (PAL), Application Specific Integrated Circuit (ASIC), Field Programmable Gate Array (FPGA), etc., which may be hardware "programmed" to include software instructions or code that provides a known output in response to known inputs. In one aspect, hardware circuitry may be used in place of, or in combination with, software instructions to implement the invention. The elements may also be implemented as discrete hardware elements that are operable to perform the operations shown using coded logical operations or by executing hardware executable code. Memories may be any semiconductor memory, such as PROM, EPROM, EEPROM or RAM, that is external to a processor and/or may be integrated with processor, i.e., cache.

While there has been shown, described, and pointed out fundamental novel features of the present invention as applied to preferred embodiments thereof, it will be understood that various omissions and substitutions and changes in the apparatus described, in the form and details of the devices disclosed, and in their operation, may be made by those skilled in the art without departing from the spirit of the present invention. It is expressly intended that all combinations of those elements that perform substantially the same function in substantially the same way to achieve the same results are within the scope of the invention. Substitutions of elements from one described embodiment to another are also fully intended and contemplated.

What is claimed is:

1. A method for determining a material of an object, based on its optical characteristics, within boundaries of a touch screen, the touch screen including on its periphery a plurality of light sources ($L_i$, i=1 to N) and sensors ($S_j$, j =1 to M), the method comprising the steps of:
   transmitting a light sequentially from each of the light sources to the object within the boundary of the touch screen, wherein a portion of the sequentially transmitted light is one or more of (i) absorbed, (ii) reflected, and (iii) transmitted by the object;
   detecting a respective presence of the sequentially transmitted light at each of the sensors, wherein one or more of the sensors receive varying degrees of the sequentially transmitted light;
   determining a respective distance from the object (i) to each of the light sources and (ii) to each of the sensors;
   determining a respective reflective index ($n_2$) of the object at each of the sensors, wherein each reflective index is based on (i) a light intensity ($I_r$) after being reflected from the object, (ii) a light intensity ($I_i$) just before light reaches a surface of the object, and (iii) a reflective index close to one; and
   determining the material of the object based on the respective determined reflective indices.

2. The method as recited in claim 1, further comprising the step of:
   determining a set of light intensity calibration data for each of the sensors for light transmitted from each of the light sources.

3. The method as recited in claim 2, wherein the step of detecting the respective presence of sequentially transmitted light at each sensor further comprises the steps of:
   measuring a light intensity at each of the sensors for each sequentially transmitted light; and
   comparing the measured light intensity at each of the sensors for each sequentially transmitted light to an associated light calibration data of the set of light intensity calibration data.

4. The method as recited in claim 1, wherein the step of transmitting the light sequentially from each of the light sources to the object comprises the step of:
   turning on each of the N light sources for a predetermined length of time in a predetermined sequence.

5. The method as recited in claim 1, wherein the step of determining the object material based on the respective determined reflective indices comprises the steps of:
   determining a first reflective index based on each sensor's determined reflective index associated with each light source;
   determining a final reflective index based on each of the first reflective indices; and
   determining the object material by correlating the final reflective index to a predetermined database of reflective indices and materials.

6. The method as recited in claim 5, wherein the step of determining the first reflective index includes using one selected from the group consisting of averaging and histogramming, and wherein the step of determining the final reflective index includes using one selected from the group consisting of averaging and histogramming.

7. The method as recited in claim 1, wherein the step of determining the object material based on the respective determined reflective indices, comprises the steps of:
   determining a final reflective index based on each of the respective determined reflective indices; and
   determining the object material by correlating the final reflective index to a predetermined database of reflective indices and materials.

8. The method as recited in claim 7, wherein the step of determining the final reflective index includes using one selected from the group consisting of averaging and histogramming.

9. A device for determining a material of an object, based on its optical characteristics, within boundaries of a touch screen, the touch screen including on its periphery a plurality of light sources ($L_i$, i=1 to N) and sensors ($S_j$, j =1 to M), the device comprising:
   a processor in communication with a memory, the processor executing the instructions of:
   transmitting a light sequentially from each of the light sources to the object within the boundary of the touch screen, wherein a portion of the sequentially transmitted light is one or more of (i) absorbed, (ii) reflected, and (iii) transmitted by the object;
   detecting a respective presence of the sequentially transmitted light at each of the sensors, wherein one or more of the sensors receive varying degrees of the sequentially transmitted light;
   determining a respective distance from the object (i) to each of the light sources and (ii) to each of the sensors;
   determining a respective reflective index ($n_2$) of the object at each of the sensors, wherein each reflective index is based on (i) a light intensity ($I_r$) after being reflected from the object, (ii) a light intensity ($I_i$) just before light reaches a surface of the object, and (iii) a reflective index close to one; and
   determining the material of the object based on the respective determined reflective indices.

10. The device as recited in claim 9, the processor further executing the instruction of:
    determining a set of light intensity calibration data for each of the sensors for light transmitted from each of the light sources.

11. The device as recited in claim 10, wherein the instruction of detecting the respective presence of sequentially transmitted light at each sensor further comprises the instructions of:
    measuring a light intensity at each of the sensors for each sequentially transmitted light; and
    comparing the measured light intensity at each of the sensors for each sequentially transmitted light to an associated light calibration data of the set of light intensity calibration data.

12. The device as recited in claim 9, wherein the instruction of transmitting the light sequentially from each of the light sources to the object comprises the instruction of:
  turning on each of the N light sources for a predetermined light of time in a predetermined sequence.

13. The device as recited in claim 9, wherein the instruction of determining the object material based on the respective determined reflective indices comprises the instructions of:
  determining a first reflective index based on each sensor's determined reflective index associated with each light source;
  determining a final reflective index based on each of the first reflective indices; and
  determining the object material by correlating the final reflective index to a predetermined database of reflective indices and materials.

14. The device as recited in claim 13, wherein the instruction of determining the first reflective index includes using one selected from the group consisting of averaging and histogramming, and wherein the instruction of determining the final reflective index includes using one selected from the group consisting of averaging and histogramming.

15. The device as recited in claim 9, wherein the instruction of determining the object material based on the respective determined reflective indices, comprises the instructions of:
  determining a final reflective index based on each of the respective determined reflective indices; and
  determining the object material by correlating the final reflective index to a predetermined database of reflective indices and materials.

16. The device as recited in claim 15, wherein the instruction of determining the final reflective index includes using one selected from the group consisting of averaging and histogramming.

17. A non-transitory computer readable media embodied with a computer program providing instructions to a computer system for determining a material of an object, based on its optical characteristics, within boundaries of a touch screen, the touch screen including on its periphery a plurality of light sources ($L_i$, i=1 to N) and sensors ($S_j$, j =1 to M), the instructions when loaded into the computer system causing the computer system to execute the steps of:
  transmitting a light sequentially from each of the light sources to the object within the boundary of the touch screen, wherein a portion of the sequentially transmitted light is one or more of (i) absorbed, (ii) reflected, and (iii) transmitted by the object;
  detecting a respective presence of the sequentially transmitted light at each of the sensors, wherein one or more of the sensors receive varying degrees of the sequentially transmitted light;
  determining a respective distance from the object (i) to each of the light sources and (ii) to each of the sensors;
  determining a respective reflective index ($n_2$) of the object at each of the sensors, wherein each reflective index is based on (i) a light intensity ($I_r$) after being reflected from the object, (ii) a light intensity ($I_i$) just before light reaches a surface of the object, and (iii) a reflective index close to one; and
  determining the material of the object based on the respective determined reflective indices.

18. The non-transitory computer readable media as recited in claim 17, the instructions causing the computer system to further execute the step of:
  determining a set of light intensity calibration data for each of the sensors for light transmitted from each of the light sources.

19. The non-transitory computer readable media as recited in claim 18, wherein the step of detecting the respective presence of sequentially transmitted light at each sensor further comprises the steps of:
  measuring a light intensity at each of the sensors for each sequentially transmitted light; and
  comparing the measured light intensity at each of the sensors for each sequentially transmitted light to an associated light calibration data of the set of light intensity calibration data.

20. The non-transitory computer readable media as recited in claim 17, wherein the step of transmitting the light sequentially from each of the light sources to the object comprises the step of:
  turning on each of the N light sources for a predetermined length of time in a predetermined sequence.

21. The non-transitory computer readable media as recited in claim 17, wherein the step of determining the object material based on the respective determined reflective indices, comprises the steps of:
  determining a first reflective index based on each sensor's determined reflective index associated with each light source;
  determining a final reflective index based on each of the first reflective indices; and
  determining the object material by correlating the final reflective index to a predetermined database of reflective indices and materials.

22. The non-transitory computer readable media as recited in claim 21, wherein the step of determining the first reflective index includes using one selected from the group consisting of averaging and histogramming, and wherein the step of determining the final reflective index includes using one selected from the group consisting of averaging and histogramming.

23. The non-transitory computer readable media as recited in claim 17, wherein the step of determining the object material based on the respective determined reflective indices, comprises the steps of:
  determining a final reflective index based on each of the respective determined reflective indices; and
  determining the object material by correlating the final reflective index to a predetermined database of reflective indices and materials.

24. The non-transitory computer readable media as recited in claim 23, wherein the step of determining the final reflective includes using one selected from the group consisting of averaging and histogramming.

* * * * *